INVENTOR
PHILIP S. HACKER

United States Patent Office 3,344,424
Patented Sept. 26, 1967

3,344,424
CONTROL CIRCUITRY FOR MULTIMODE RADAR
Philip S. Hacker, Silver Spring, Md., assignor, by mesne assignments, to the United States of America as represented by the Secretary of the Navy
Filed Dec. 30, 1965, Ser. No. 517,874
8 Claims. (Cl. 343—16)

ABSTRACT OF THE DISCLOSURE

The disclosure describes a microwave control circuit which can be used to direct the energy to produce a lobe-on-receive-only synthetic conical scan system, as well as a terrain follow mode which is essentially a vertical plane monopulse. This is done such that only two microwave channels need be brought through rotary joints from the outer antenna gimbal to the receiver transmitter section of the radar and only one of these channels need be designed for high power transmissions. The selection of the modes is accomplished by utilizing two hybrid couplers, two ferrite phase shifters and an adjustable line stretcher.

---

Figure 1:
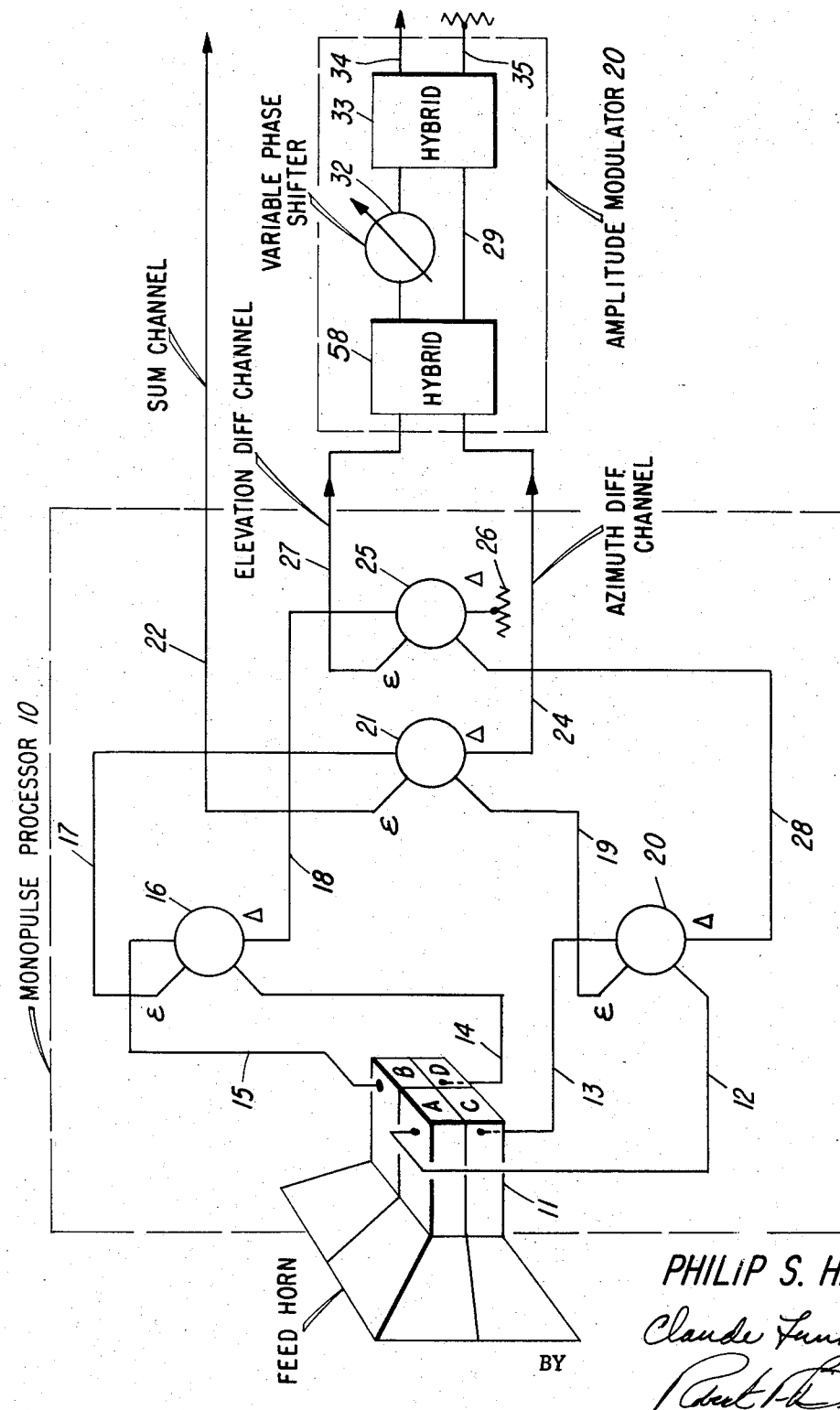

The present invention relates to airborne radar systems and more particularly to a microwave control circuitry which permits a single radar system to perform a plurality of functions.

Modern aircraft weapons systems require a multiplicity of functions to be performed by radar systems. Therefore, it is desirable because of portability requirements to provide a single radar that will have the capability to operate in a plurality of modes for performing intercept search, track function and terrain follow. In addition, these operating functions must not be susceptible to enemy jamming techniques, this is especially true for the tracking function mode since this technique is usually most susceptible to certain types of angle deception jammers.

Prior art techniques have used a variety of apparatus to overcome the problem of having a single radar perform a multiplicity of functions. The most common of these techniques being the use of a monopulse radar antenna system. This type of radar system obtains a complete measurement of the target's angular position together with its range measurement with the same pulse; the target's position in these dimensions may then be determined completely. Usually this technique is unsuitable for pulse Doppler radars because of receiver complexity. Another technique is to convert the standard monopulse sum, azimuth difference and elevation difference signals to a synthetic conical scan on receive only by suitably modulating and combining these signals before detection. Normally, this requires numerous devices such as switches, isolators, circulators, and directional couplers. These types of mechanizations inherently cause an increase in the complexity of the antenna input system.

The present invention permits a single radar system to perform a multiplicity of modes by providing a microwave control circuitry that requires only two microwave channels. This permits simplification of the microwave antenna rotary joints necessary to connect the antenna gimbaling to the receiver-transmitter section of the radar system. In addition with the control circuitry disclosed, there is a need only for two channels and only one of these need be designed to carry high radio frequency power.

An object of the present invention is to provide a simple microwave control circuitry for a radar system.

Another object of the present invention is to provide a technique that makes feasible the installation of high performance multi-mode radar systems in tactical aircraft.

A further object of the present invention is the provision of a microwave control system that allows a single radar system to perform multi-mode functions.

Another object of the present invention is the provision of a microwave control circuitry that performs the complex mode switching function with an absolute minimum of active microwave devices.

Still another object of the present invention is to provide a microwave control circuitry that permits a single radar system to perform a multiplicity of functions and needs but two transmit-receive microwave channels.

Figure 2:
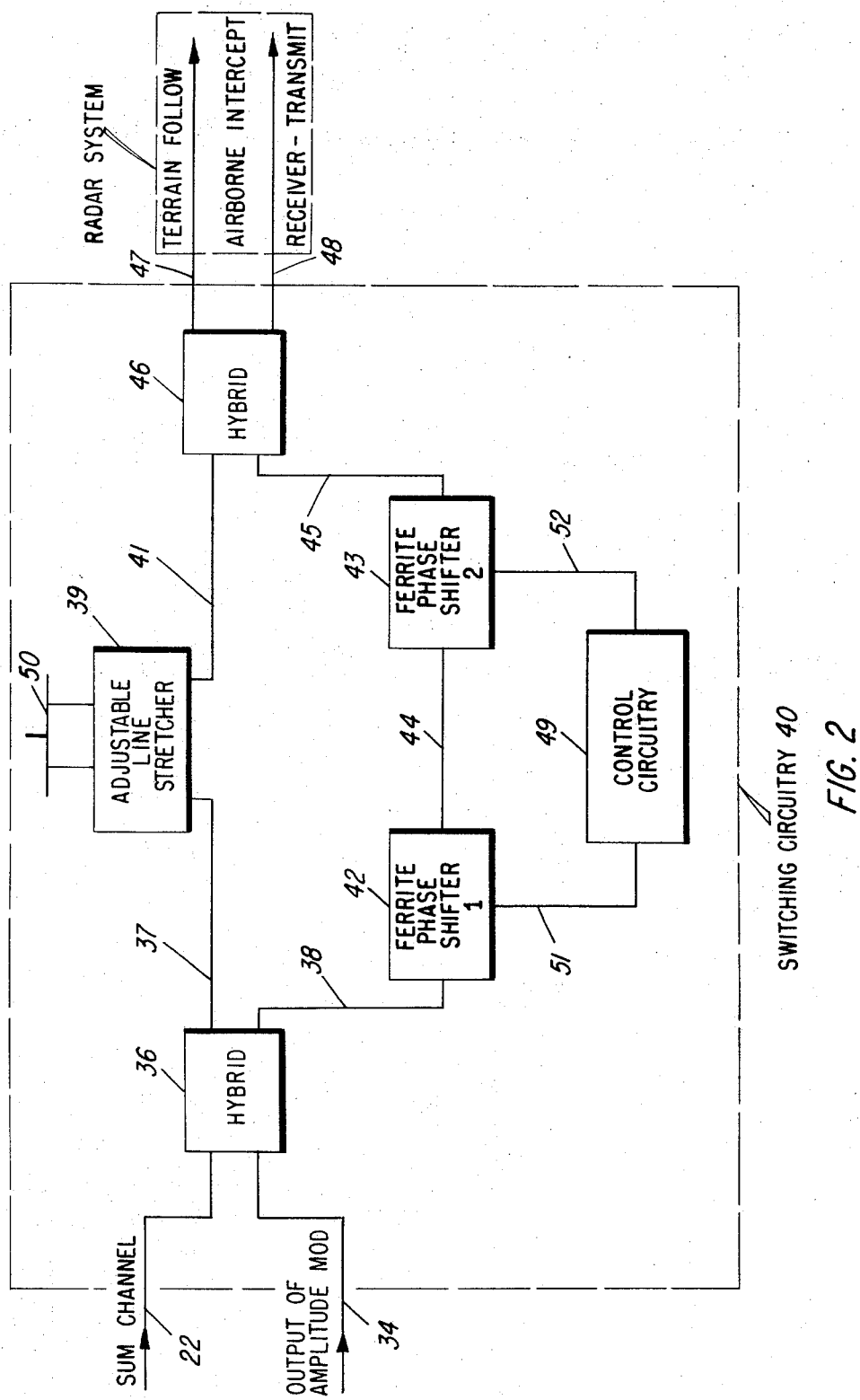

Other objects, advantages and novel features of the invention will become apparent from the following detailed description of the invention when considered in conjunction with the accompanying drawings wherein:

FIG. 1 illustrates the functional block diagram of the monopulse processor and the amplitude modulator; and FIG. 2 illustrates the microwave control circuitry that allows selection of a multiplicity of mode functions for a single radar.

Referring now to FIG. 1 wherein there is illustrated a functional block diagram of a monopulse processor labeled generally as 10. A feed horn of conventional design, shown here as a pyramidal horn, is divided up into a number of waveguide sections 11 designated as A, B, C, and D. Electrically and physically coupled to these respective waveguides are hybrid junctions 16, 20, 21, and 25. Hybrid junction 16 is electrically and mechanically coupled to waveguide sections B and D by means of lines 14 and 15, respectively; these lines representing waveguide sections. The other two waveguide sections of the feed horn, A and C, are shown as physically and electrically connected to the two input arms of hybrid junction 20 by means of lines 12 and 13, respectively. These lines 12, 13, 14, and 15 are functional representations of connecting waveguide sections. The output arms of magic T, or hybrid illustrated symbolically as element 16, connects the difference of the waveguide energy from B and D sections to the magic T 25. The difference energy is conducted by means of a waveguide section 18 to one of the inputs of hybrid junction 25; the difference energy being coupled in impedance 26. The other output of hybrid junction 16 carries the sum energy to hybrid junction 21 by means of waveguide length 17. A sum and difference output are taken from hybrid junction 25; the sum energy from this junction being fed to the amplitude modulator by means of waveguide 27 and the difference output being terminated at 26. The outputs of hybrid 21 are conducted by means of waveguides 22 and 24, respectively, to the sum channel (waveguide 22) and azimuth difference channel (waveguide 24), respectively. The sum energy of hybrid junction 20 is coupled to hybrid junction 21 by means of waveguide sections 19; the difference energy being coupled to hybrid 25 by means of waveguide 28. The difference channel signals from hybrid 21 is conducted to the lower arm of hybrid 58 in the amplitude modulator section 20 by means of a waveguide section designated as 24. The elevation difference channel is connected, by means of waveguide 27, to the upper arm of hybrid coupling 28 in amplitude modulator 20. The microwave energy to hybrid 28 is representative of the azimuth difference energy of a possible target. As illustrated, hybrid coupler 58 has two outputs each from an upper and lower arm. One of these outputs is coupled to the input of variable phase shifter 32 and the other is coupled by means of line 29 to a second hybrid coupler 33; the other input to hybrid coupler 33 being connected to the output of phase shifter 32. The output of hybrid coupler 33 in the amplitude modulator section 20 is coupled to a hybrid coupling 36 in switching control circuitry 40; the other side of hybrid coupler 33 illustrated as terminated in its characteristic impedance 35.

Referring now to FIG. 2, which illustrates the switching control circuitry 40, the two waveguide sections 22 and 34, respectively couple the sum and amplitude channels to hybrid 36. This hybrid has two outputs, an upper and lower. The upper is coupled by means of line 37 to the input of adjustable line stretcher 39. The line stretcher 39 is a device for changing the electrical length of the line by shortening or lengthening the line. This may be accomplished by constructing a standard 90° hybrid junction terminated in manually adjustable short circuits in its collinear arms. In this manner, the electrical length of the line may be changed by physically shortening or removing a short to effectively shorten or lengthen the line. The output energy of the stretcher then will be phase shifted a predetermined amount from the input depending upon the phase shift. This energy is coupled by means of line 41, repersenting a waveguide section, to the upper input of hybrid coupling junction 46. The output of this hybrid is coupled to the input of the elevation difference receiver for terrain follow mode of operation (not shown).

The lower output of hybrid 36 is coupled to ferrite phase shifter 42 via waveguide line representation 38; the output energy from block 42 being coupled to the input of hybrid 46 via waveguide section 44, latching ferrite phase shifter 43 and waveguide section 45. The output of the lower lead 48 of hybrid 46 is coupled to receiver transmit of radar system (not shown). The phase shifters 42 and 43, respectively, are of the latching type and are generally constructed by placing a ferrite pencil or rod (a magnetic material of very low conductivity) axially located in a rectangular waveguide. A conductor is passed through an axial hole in the ferrite and is then bent away at both ends of the ferrite rod and brought through the waveguide walls in such a manner that the conductor is always perpendicular to the microwave electric fields. If a magnetic field is placed so that it is along the axial direction of the ferrite rod and a wave with vertical electric polarization is incident, for example, from the left side of a waveguide, then in passing through the ferrite zone its plane of polarization is rotated by an angle $\theta$. If the output wave is sent back through the waveguide from right to left, the plane of polarization of the backward wave rotates another angle $\theta$ as in the initial rotation. In other words, the polarization of the new output wave on the left is rotated from an initial plane by $2\theta$ instead of zero degrees. Thus this device constitutes a non-reciprocal circuit element. To obtain this action a high current pulse generated by control circuitry 49 is passed through the conductors of latching ferrite phase shifters 42 and 43, respectively, by means of lines 51 and 52, respectively. This current causes the conductor to form a circumferential saturating magnetic field in the ferrite. Because the ferrite has a square wave hysteresis characteristic the rod or pencil will remain magnetized after passage of the current pulse and the propagation constant of the waveguide will be altered in a non-reciprocal manner until the magnetization state is removed by another pulse from control circuitry 49. The two latching ferrite elements 42 and 43, respectively, are constructed to exhibit a phase shift of plus 22.5 degrees in one magnetization state for one direction of wave propagation and minus 22.5 degrees phase shift for the other direction of propagation.

In multi-mode function of operation the feed horn 11 receives and transmits the microwave energy to the monopulse processor 10. Functional block 10 operates as a monopulse processing circuitry to give energy outputs from which the sum, azimuth difference and elevation difference signals are derived. These difference signals are fed to function block 20 which shows a mechanization for a one hundred percent amplitude modulator, which modulates these signals (elevation and azimuth difference) in quadrature at the synthetic conical scan lobing rate of the radar system. The variable phase shifter 32 is used to adjust the phase shift linearity with respect to time. This in conjunction with the operation of the control circuitry functional block 40 permits switching of an airborne radar monopulse system to either of the two modes of operation; airborne intercept search and track function or terrain follow function for low altitude attack capabilities. In the airborne receive, only conical scan mode, the variable phase shifter 32 is electrically or manually turned on and the line stretcher 39 is adjusted by means of line shorting mechanism, represented by 50, for 45 degrees phase shift. The latching ferrite phase shifters 42 and 43, respectively, are energized by control circuitry 49 to set a plus 22.5 degrees phase shift for right to left propagation and a minus 22.5 degrees for left to right propagation.

On transmit then, energy travels from right to left through control circuitry block 40 where the upper leg having adjustable line stretcher 39 therein and the lower leg having the ferrite phase shifters 42 and 43 therein will exhibit equal delay paths. All of the energy then emerges from the microwave channel 22 leading to the sum channel input to the monopulse processor functional block 10. This results in a bore-sighted non-lobing transmitted beam from the feed horn antenna 11. On receive, the feed horn conducts the energy to waveguide sections A, B, C, and D. The sum channel signals in microwave section 22, and the difference channel signals in microwave 24 and 27, respectively, emerges from functional block 10 then via amplitude modulator 20 enter functional block 40 and after passing through hybrid 36 travel from left to right. In this direction, there is a 90° differential length between the energy travelling through the upper path (line stretcher) and that which travels through the lower path (ferrite phase shifters). Under these conditions, the entire functional block 40 effectively acts as a simple, directional coupler such that the signals in the transmitter receiver output arm 48 is just that of a conically scanning antenna.

In the second mode, that is the terrain follow mode, the phase shifter 32 in functional block 20 is set so that only the elevation difference signal energy travelling through line 27 will emerge from the hybrid coupling 33 output along microwave section 34. The adjustable line stretcher for the sum channel is set for zero degrees phase shift. The latching ferrite 42 and 43, respectively, are energized by control circuitry 49 and are driven such that the left phase shifter 42 exhibits plus 22.5 degrees for right to left propagation and minus 22.5 degrees for right propagation, and the right hand phase shifter 43 is set for just the opposite characteristics. During the transmit period both the upper path having adjustable line stretcher 39 therein and the lower path having the respective phase shifters 42 and 43 therein again have the same electrical length, and once again the resulting output will be the full output to the sum channel 22 and this will result in a bore sighted radiated beam from the feed horn 11.

On receive the sum channel represented by line 22 is delivered through control circuitry 40 to the receive transmitter waveguide section 48 with no difference channel components because in this direction of propagation, the upper path (that with the adjustable line stretcher 39) and the lower path (that with the latching ferrite phase shifters 42 and 43, respectively,) are again equal. The elevation difference signal through waveguide 27 enters hybrid 36 through line 34 and emerges from the upper side of hybrid 46 on line 47 which couples this energy to the terrain follow receiver section of the radar system.

The present invention provides an effective control switching circuitry system that is completely electronic and operates with a minimum of active microwave devices. This provides for a system that is adapted to be positioned on the antenna structure and which only requires that two microwave channels be coupled to the receiver transmitter section of the radar set. The only rotary joints required would be at lines 47 and 48 and only one of these need be a high powered joint. Also, the switching load is accomplished simply and quickly by three operations; first operating phase shifter 32, second mechanically operating line stretcher 39, and third sending a short current pulse through the latching phase shifter sections. Also with the above system any level of crossover can be achieved by selecting the line stretcher and latching ferrite sections absolute magnitude of phase shift to be other than 45 degrees, larger values of phase shift will yield deeper crossovers. By making the line stretcher variable in steps and the latching ferrite devices in many individual controllable steps, the crossover can be adjusted to any predetermined value desired by the equipment operator.

Obviously many modifications and variations of the present invention are possible in the light of the above teachings. It is therefore to be understood that within the scope of the appended claims the invention may be practiced otherwise than as specifically described.

What is claimed is:

1. A control switching circuitry for microwave systems which permits a multiplicity of functions to be performed by a single radar comprising:
    microwave processing means for converting monopulse microwave energy into sum and difference energy signal components;
    amplitude modulator means electrically coupled to said processing means for receiving the difference energy signal components and modulating said difference energy signals in quadrature relationship; and
    microwave switching circuitry means electrically connected to receive the sum energy signal component from said microwave processing means and the modulated signal from said amplitude modulator means for providing a predetermined phase shift to each of said sum energy signal and modulated energy signal, and said microwave switching circuitry consisting of a
        first hybrid coupling means having first and second inputs and first and second outputs, said first input coupled to receive said sum energy signal and said second input coupled to receive said difference energy,
        second hybrid coupling means having first and second inputs and first and second outputs, said first and second outputs coupled to a radar system,
        variable phase shifting means electrically coupled between the outputs of said first hybrids and the inputs of said second hybrid.

2. The circuitry apparatus of claim 1 wherein said variable shifting means comprise
    adjustable line stretcher means coupled between said first output of said first hybrid and said input of said second hybrid; and
    first and second variable shifter means coupled in series relationship between said second output of said first hybrid and said second input of said second hybrid.

3. The circuitry apparatus of claim 2 wherein said variable shifter means comprise
    a first latching ferrite phase shifter and a second latching ferrite phase shifter.

4. The circuitry apparatus of claim 3 wherein said latching ferrite phase shifters comprise
    non-reciprocal phase shifters.

5. A control switching circuitry for microwave systems which permits a multiplicity of functions to be performed by a single radar comprising:
    microwave processing means for converting monopulse microwave energy into sum and difference energy signal components;
    amplitude modulator means electrically coupled to said processing means for receiving the difference energy signal components and modulating said difference energy signals in quadrature relationship, and wherein said amplitude modulator comprises
        a first hybrid microwave coupling means having two inputs and two outputs, said first input coupled to receive said difference energy signal representative of an elevation signal and said second input coupled to receive said difference energy signal representative of an azimuth signal,
        phase shifter means operable to shift the phase of microwave signals by predetermined amounts, and
        a second hybrid microwave coupling means having two inputs and two outputs, said first input coupled via said phase shifter means to said output of said first hybrid means and said second input coupled to said second output of said first hybrid,
        the energy received from said microwave processing means and said amplitude modulator means is shifted in phase by predetermined amounts so that a multiplicity of receive and transmit signal energy modes will occur substantially simultaneously with no interference to said difference and said modulated energy signals, and
    microwave switching circuitry means electrically connected to receive the sum energy signal component from said microwave processing means and the modulated signal from said amplitude modulator means for providing a predetermined phase shift to each of said sum energy signal and modulated energy signal.

6. A control switching circuitry for microwave systems which permits a multiplicity of functions to be performed by a single radar comprising:
    microwave processing means for converting monopulse microwave energy into sum and difference energy signal components;
    amplitude modulator means electrically coupled to said processing means for receiving the difference energy signal components and modulating said difference energy signals in quadrature relationship; and
    microwave switching circuitry means electrically connected to receive the sum energy signal component from asid microwave processing means and the modulated signal from said amplitude modulator means for providing a predetermined phase shift to each of said sum energy signal and modulated energy signal, and wherein said microwave switch circuitry consists of
        a first channel coupled to receive the sum energy signal, having a first variable shifting means consisting of a line stretcher for shifting the phase of said sum signal to predetermined values, and
        a second channel having a second variable shifting means.

7. The circuitry apparatus of claim 6 wherein said second variable shifting means comprises.
    a first and second series coupled ferrite phase shifting means for shifting the phase of said difference channel in predetermined values.

8. The circuitry apparatus of claim 7 wherein said first and second phase shifting means comprise
    non-reciprocal latching ferrite phase shifters.

References Cited

UNITED STATES PATENTS

| | | | |
|---|---|---|---|
| 2,934,757 | 4/1960 | Hoefer et al. | 343—16 |
| 2,988,739 | 6/1961 | Hoefer et al. | 343—16 |

RODNEY D. BENNETT, *Primary Examiner.*

CHESTER L. JUSTICE, *Examiner.*

J. P. MORRIS, *Assistant Examiner.*